Sept. 13, 1932.  H. ANDVIG  1,877,441
ADVERTISING DEVICE
Filed Nov. 13, 1928   2 Sheets-Sheet 2

INVENTOR
Hans Andvig,
by
ATTORNEY

Patented Sept. 13, 1932

1,877,441

UNITED STATES PATENT OFFICE

HANS ANDVIG, OF OSLO, NORWAY

ADVERTISING DEVICE

Application filed November 13, 1928, Serial No. 319,063, and in Germany January 24, 1928.

This invention relates to advertising devices of the kind in which pictures mounted in a holder or picture carrying ribbon performing a stepwise movement are projected by means of a number of projecting devices on different projecting surfaces.

The object of the invention is to provide an advertising device of the kind specified, which can easily be adapted for the projection of pictures on various projecting surfaces, such as walls, side-walks, windows etc. according to the locality in which the advertising device is to be placed.

In order to attain this object of the invention, the several projectors of the advertising device which may have one source of light in common, are each combined with an adjustable reflecting surface, such as a mirror, adapted to be tilted about two axes so that the pictures projected thru each projector may be directed against any surface in the neighbourhood of the advertising device by the simple adjustment of the reflecting mirror cooperating with the said projector.

According to one preferred embodiment of the invention the projecting device comprising picture holder, source of light and a suitable number of projectors, is mounted in a case, the side walls of which are formed by translucent picture surfaces on which the pictures from a number of the projectors are projected, whereas other projectors throw their pictures on reflecting surfaces outside the casing in order to be projected on convenient picture surfaces in the neighbourhood.

Figure 1:
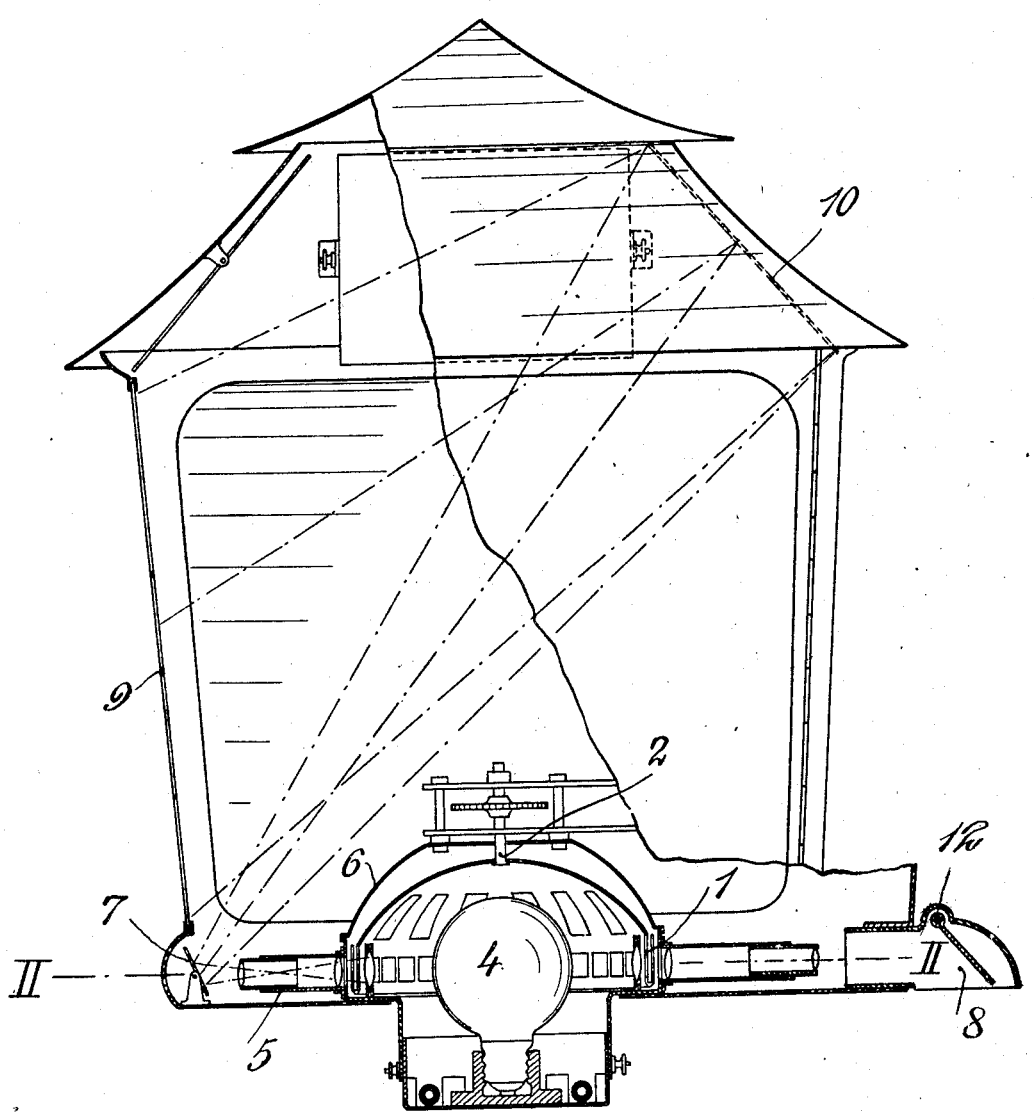
Figure 2:
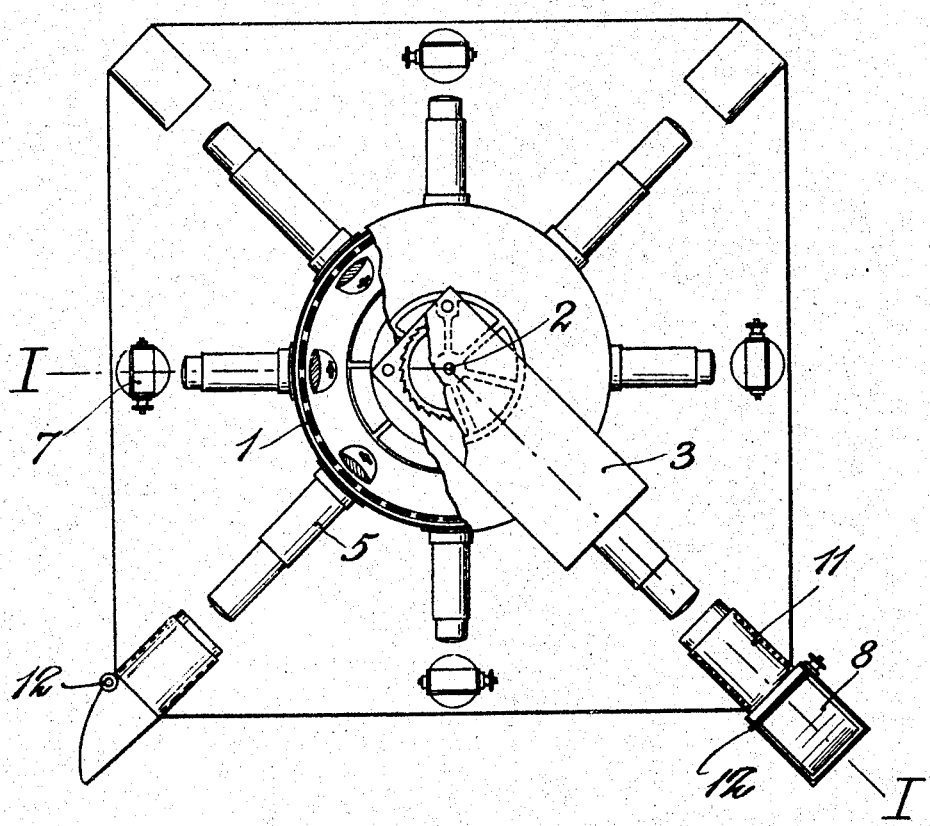

In the drawings Fig. 1 is a vertical sectional view on the line I—I of Fig. 2, and Fig. 2 is a cross section on the line II—II of Fig. 1.

The projecting device comprises an annular picture holder 1 mounted to rotate upon a vertical axis 2, which is given a stepwise movement by means of any conventional operating device 3, which may be electrically or otherwise operated. The source of light, such as an electric lamp 4 is mounted in the center of the ring, and a number of projectors 5 are mounted radially in a stationary casing 6 enclosing the rotatable picture holder 1.

The pictures projected by the projecting device 5 are cast on reflecting surfaces, such as mirrors 7 or 8, said mirrors being adjustable so as to direct the pictures at convenient picture surfaces surrounding the projecting device.

In accordance with the embodiment illustrated, some of these picture surfaces are formed by the stained glass sides 9 of a lantern shaped casing enclosing the projecting device from the mirrors 7. The light rays are projected on the auxiliary mirrors 10 near the top of the said casing, and from said auxiliary mirrors 10 they are again reflected on to the stained glass sides 9.

The use of the auxiliary mirrors 10 makes it possible to obtain a sufficient projecting distance between the projectors 5 and the picture surfaces 9.

Other reflecting mirrors such as 8, are mounted in tubes 11, which are co-axial with the projecting devices and are adapted to be adjusted in linear direction of and angularly about their axes.

At the same time the said mirrors 8 are adapted to be adjusted angularly about an axis 12, so that it will be seen that the mirrors are variously adjustable and that the pictures reflected thereby may be directed at any convenient picture surface in the neighbourhood of the device.

Although it is preferred to combine the projecting device with a lantern shaped casing, such as illustrated, the invention is not limited to the combination of the projecting device with a lantern of this kind, as the device according to the invention may also be utilized solely for the purpose of projecting advertising pictures and the like in succession on a number of conveniently situated projection surfaces surrounding the device.

What I claim is:

1. In an advertising device, in combination a stationary casing, a plurality of projection means mounted radially therein, a light source centrically located with respect to said projection means, a picture holder rotatably mounted in optical relation to said projection means, a plurality of adjustable reflecting surfaces in incident relation to and cooperation with said projection means and a plurality of secondary reflecting surfaces, positioned in optical relation to and cooperating with the aforesaid adjustable reflecting surfaces.

2. In an advertising device, in combination, a stationary casing, a plurality of projection means mounted radially therein, a light source centrically located with respect to said projection means, a picture holder rotatably mounted in optical relation to said projection means, a plurality of reflecting surfaces in optical relation to and cooperating with said projection means and adjusting means supporting each of said reflecting surfaces comprising a tube co-axially and rotatably mounted with respect to said projection means and containing a reflecting surface rotatably mounted about a transverse axis.

In testimony whereof I affix my signature.

HANS ANDVIG.